United States Patent
Webster et al.

(10) Patent No.: US 8,018,832 B2
(45) Date of Patent: Sep. 13, 2011

(54) PACKET GENERATION SYSTEMS AND METHODS

(75) Inventors: Mark A. Webster, Indian Harbor Beach, FL (US); Daniel Shearer, Scottsdale, AZ (US)

(73) Assignee: Xocyst Transfer AG L.L.C., Wilmington, DE (US)

( * ) Notice: Subject to any disclaimer, the term of this patent is extended or adjusted under 35 U.S.C. 154(b) by 872 days.

(21) Appl. No.: 11/106,915

(22) Filed: Apr. 15, 2005

(65) Prior Publication Data

US 2005/0237988 A1 Oct. 27, 2005

Related U.S. Application Data

(60) Provisional application No. 60/562,222, filed on Apr. 15, 2004.

(51) Int. Cl.
*H04J 11/00* (2006.01)
(52) U.S. Cl. ........ 370/208; 370/204; 370/330; 370/338; 370/344; 370/480; 375/260; 375/272
(58) Field of Classification Search .................. 370/464, 370/480, 343, 210, 208, 203–218, 328–330, 370/338, 344; 375/350, 349, 272
See application file for complete search history.

(56) References Cited

U.S. PATENT DOCUMENTS

| | | | | |
|---|---|---|---|---|
| 6,456,657 B1 * | 9/2002 | Yeap et al. | ............... | 375/240.12 |
| 6,657,950 B1 * | 12/2003 | Jones et al. | ............... | 370/208 |
| 6,735,221 B1 * | 5/2004 | Cherubini | ............... | 370/485 |
| 6,741,551 B1 * | 5/2004 | Cherubini | ............... | 370/210 |
| 6,856,653 B1 * | 2/2005 | Taniguchi et al. | ............ | 375/285 |
| 6,947,509 B1 * | 9/2005 | Wong | ............... | 375/350 |
| 7,023,324 B2 * | 4/2006 | Kodama et al. | ............... | 375/260 |
| 7,206,350 B2 * | 4/2007 | Korobkov et al. | ............ | 375/260 |
| 7,443,917 B2 * | 10/2008 | Vitenberg | ............... | 375/260 |
| 7,623,439 B2 * | 11/2009 | Webster et al. | ............... | 370/203 |
| 7,742,388 B2 * | 6/2010 | Shearer et al. | ............... | 370/204 |
| 2003/0231714 A1 * | 12/2003 | Kjeldsen et al. | ............ | 375/259 |
| 2005/0233710 A1 * | 10/2005 | Lakkis et al. | ............... | 455/102 |
| 2006/0018249 A1 * | 1/2006 | Shearer et al. | ............... | 370/208 |
| 2007/0183308 A1 * | 8/2007 | Korobkov et al. | ............ | 370/208 |

OTHER PUBLICATIONS

Manoneet Singh; et al.; IEEE P802.11 Wireles LANs; WWiSE Proposal : High throughput extension to the 802.11 Standards; Presentation Aug. 13, 2004; pp. 1-74.
Syed Aon Mujtaba; IEEE P802.11 Wireless LANs; TGn Sync Proposal Technical Specification; Presentation Aug. 13, 2004; pp. 1-148.
Aon Mujtaba; Doc.: IEEE 802.11-04/888r0; tgN Sync Proposal; Presentation Aug. 13, 2004; pp. 1-37.
S. Coffey, et al., WWiSE group; doc.: IEEE 802.11-04/0935r3; WWiSE IEEE 802.11n Proposal; Presentation Sep. 16, 2004.
International Preliminary Report on Patentability for PCT/US2005/012654, issued Nov. 13, 2007.
International Search Report for PCT/US2005/012654, mailed Oct. 26, 2007.

* cited by examiner

*Primary Examiner* — Christopher P Grey

(57) ABSTRACT

Disclosed herein are various embodiments of methods, systems, and apparatus for increasing packet generation in a digital communication system. In one exemplary method embodiment, multiple input signals are interpolated, shifted, and aggregated into a composite signal for transmission over a network.

23 Claims, 15 Drawing Sheets

PACKET GENERATION SYSTEMS AND METHODS

CROSS-REFERENCE TO RELATED APPLICATION

This application claims priority to copending U.S. provisional application having Ser. No. 60/562,222, filed Apr. 15, 2004, which is entirely incorporated herein by reference.

1. FIELD OF THE INVENTION

The present invention is generally related to digital communications and, more particularly, is related to a system and method for increased bandwidth digital communications.

2. RELATED ART

Communication networks come in a variety of forms. Notable networks include wireline and wireless. Wireline networks include local area networks (LANs), DSL networks, and cable networks, among others. Wireless networks include cellular telephone networks, classic land mobile radio networks and satellite transmission networks, among others. These wireless networks are typically characterized as wide area networks. More recently, wireless local area networks and wireless home networks have been proposed, and standards, such as Bluetooth and IEEE 802.11, have been introduced to govern the development of wireless equipment for such localized networks.

A wireless local area network (LAN) typically uses infrared (IR) or radio frequency (RF) communications channels to communicate between portable or mobile computer terminals and stationary access points or base stations. These access points are, in turn, connected by a wired or wireless communications channel to a network infrastructure which connects groups of access points together to form the LAN, including, optionally, one or more host computer systems.

Wireless protocols such as Bluetooth and IEEE 802.11 support the logical interconnections of such portable roaming terminals having a variety of types of communication capabilities to host computers. The logical interconnections are based upon an infrastructure in which at least some of the terminals are capable of communicating with at least two of the access points when located within a predetermined range, each terminal being normally associated, and in communication, with a single one of the access points. Based on the overall spatial layout, response time, and loading requirements of the network, different networking schemes and communication protocols have been designed so as to most efficiently regulate the communications.

IEEE Standard 802.11 ("802.11") is set out in "Wireless LAN Medium Access Control (MAC) and Physical Layer (PHY) Specifications" and is available from the IEEE Standards Department, Piscataway, N.J. 802.11 permits either IR or RF communications at 1 Mbps, 2 Mbps and higher data rates, a medium access technique similar to carrier sense multiple access/collision avoidance (CSMA/CA), a power-save mode for battery-operated mobile stations, seamless roaming in a full cellular network, high throughput operation, diverse antenna systems designed to eliminate "dead spots," and an easy interface to existing network infrastructures.

The 802.11a standard defines data rates of 6, 12, 18, 24, 36 and 54 Mbps in the 5 GHz band. Demand for higher data rates may result in the need for devices that can communicate with each other at the higher rates, yet co-exist in the same WLAN environment or area without significant interference or interruption from each other, regardless of whether the higher data rate devices can communicate with the 802.11a devices. It may further be desired that high data rate devices be able to communicate with the 802.11a devices, such as at any of the standard 802.11a rates.

Increasing the data rate and allowing more effective use of bandwidth for devices operating in these bands enables more efficient communications. A higher data rate may enable service providers to more effectively use their allotted spectrum. Consumers may realize a cost savings as well.

SUMMARY

This disclosure describes systems and methods for increasing packet generation in a digital communication system. In one exemplary method embodiment, multiple input signals are interpolated, shifted, and aggregated into a composite signal for transmission over a network. In an exemplary system embodiment, a system targeted at a new IEEE 802.11n standard receives two 20 MHz signals compliant with IEEE 802.11a, interpolates each signal by 2, shifts one signal up 10 MHz, shifts the other signal down 10 MHz, and adds the signals together to produce a composite 40 MHz signal.

Other systems, methods, features and advantages of the disclosure will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the disclosed systems and methods. In the figures, like reference numerals designate corresponding parts throughout the different views.

DETAILED DESCRIPTION

Disclosed herein are various embodiments of packet generation systems and methods. One system embodiment comprises logic that receives a number of digital signals, multiplies the signal sample rate by the number of received signals (e.g., an interpolation), shifts the signals with respect to a center frequency, and accumulates the shifted signals into one signal. The interpolating, shifting, and accumulating may be done in any type of processor including, but not limited to, a digital signal processor (DSP), a microprocessor (MCU), a general purpose processor, an application specific integrated circuit (ASIC), among others. One system embodiment comprises receiving 20 megahertz (MHz) inputs from an 802.11 a system for transmission in a 40 MHz system. A new standard is being proposed, referred to as 802.11n ("the 802.11n proposal"), which is a high data rate extension of the 802.11a standard at 5 GHz. It is noted that, at the present time, the 802.11n proposal is only a proposal and is not yet a completely defined standard. Although described in the context of 802.11a and an 802.11n proposal, other applicable standards include Bluetooth, xDSL, other sections of 802.11, etc.

Figure 1:
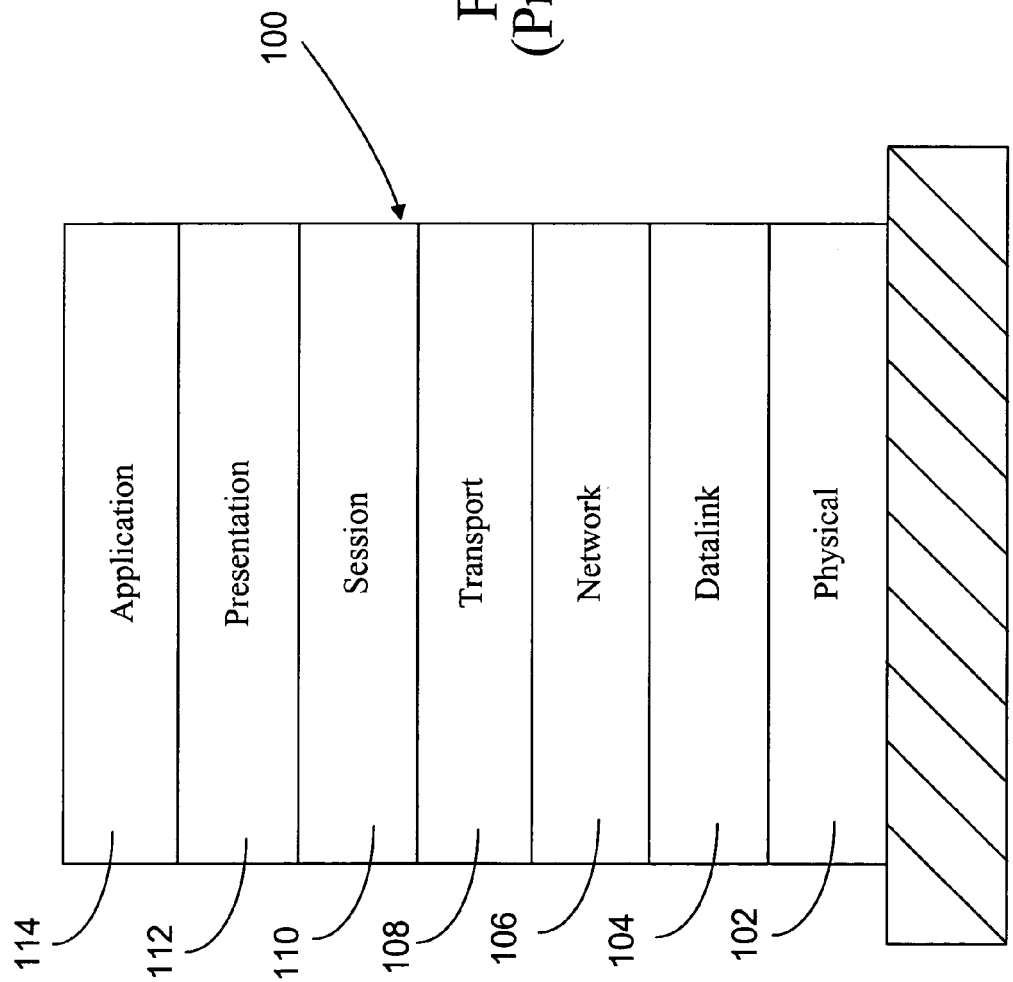
FIG. 1 is a block diagram illustrating an International Organization for Standards (ISO) Basic Reference Model of open systems interconnection (OSI).

802.11 is directed to wireless LANs, and in particular specifies the MAC and the PHY layers. These layers are intended to correspond closely to the two lowest layers of a system based on the ISO Basic Reference Model of OSI, i.e., the data link layer and the physical layer. FIG. 1 shows a diagrammatic representation of an open systems interconnection (OSI) layered model 100 developed by the International Organization for Standards (ISO) for describing the exchange of information between layers in communication networks. The OSI layered model 100 is particularly useful for separating the technological functions of each layer, and thereby facilitating the modification or update of a given layer without detrimentally impacting on the functions of neighboring layers.

At a lower most layer, the OSI model 100 has a physical layer or PHY layer 102 that is responsible for encoding and decoding data into signals that are transmitted across a particular medium. Above the PHY layer 102, a data link layer 104 is defined for providing reliable transmission of data over a network while performing appropriate interfacing with the PHY layer 102 and a network layer 106. The network layer 106 is responsible for routing data between nodes in a network, and for initiating, maintaining and terminating a communication link between users connected to the nodes. A transport layer 108 is responsible for performing data transfers within a particular level of service quality. A session layer 110 is generally concerned with controlling when users are able to transmit and receive data. A presentation layer 112 is responsible for translating, converting, compressing and decompressing data being transmitted across a medium. Finally, an application layer 114 provides users with suitable interfaces for accessing and connecting to a network.

Figure 2:
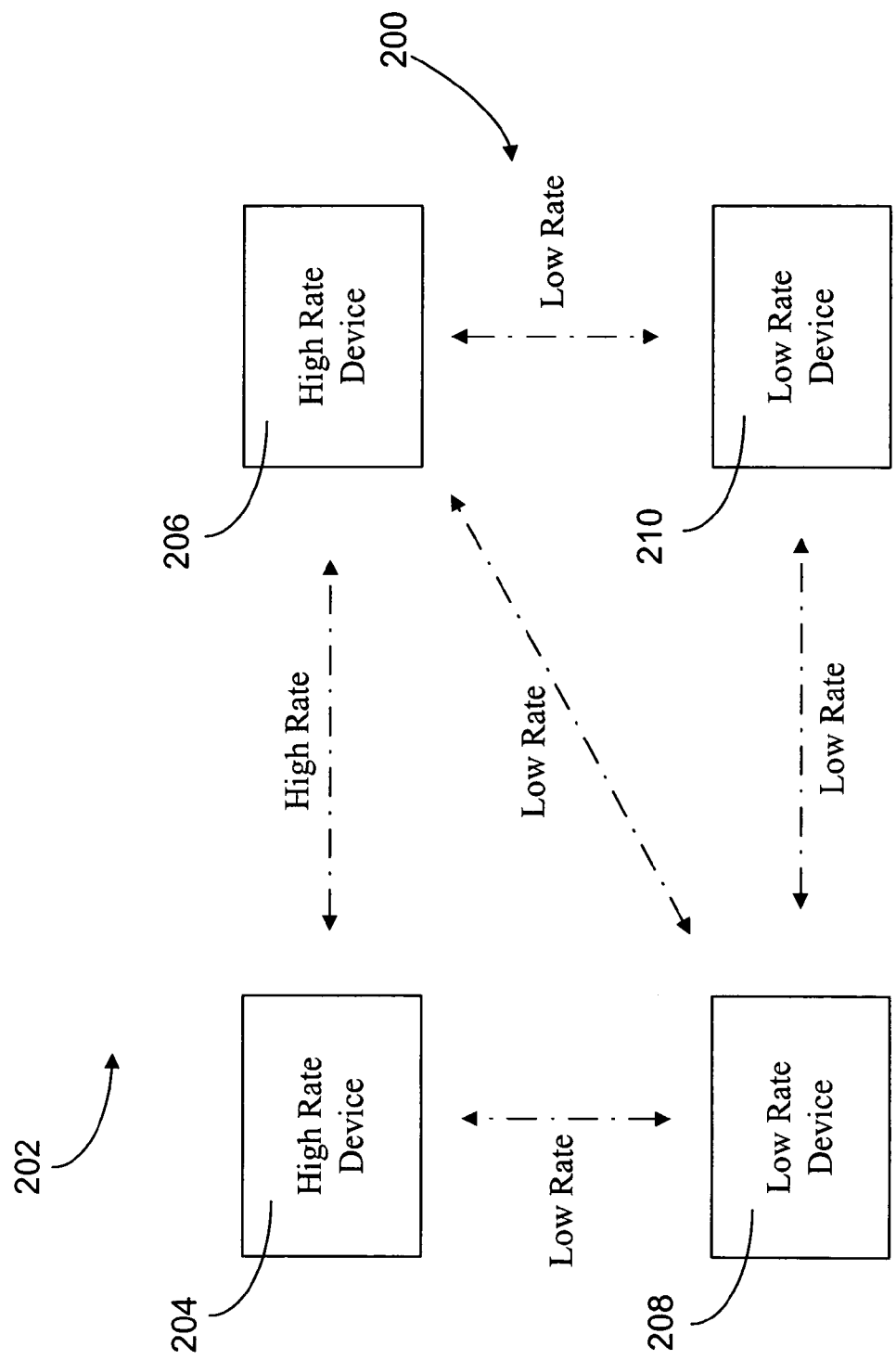
FIG. 2 is a block diagram of an exemplary embodiment of a local area network with devices communicating at different data rates.

FIG. 2 is a block diagram of a wireless local area network (WLAN) system 200 operating within area 202, including four WLAN devices 204, 206, 208 and 210. Devices 204 and 206 are implemented according to at least one of several embodiments compliant with the 802.11n proposal, whereas devices 208 and 210 are implemented according to the 802.11a standard. All of the devices 204-210 operate in the 5 GHz band. The devices 204-210 may include any type of wireless communication device, such as a computer (desktop, portable, laptop, etc.), a television set, infrared devices, a set-top box, a cellular phone, a portable phone, a radio, compatible telecommunication devices, a personal digital assistant (PDA), or other network device, such as printers, facsimile machines, scanners, hubs, switches, routers, etc., or other consumer electronics device. Although described in the context of a communications environment compliant with one or more of the 802.11n proposal, the 802.11a standard, the 802.11b standard or the 5 GHz frequency band, other standards and frequencies may be utilized in some embodiments.

Devices 208 and 210 communicate with each other at any of the standard 802.11a rates. The devices 204 and 206 communicate with each other at different data rates than devices 208 and 210. In one or more embodiments, devices 204-210 may operate or coexist in the area 202 without significant interference from each other, where the devices 204, 206 communicate with each other at different data rates than the 802.11a devices 208, 210. In one embodiment, devices 204, 206 can communicate with either or both of devices 208, 210 at any one or more of the standard 802.11a data rates. In one embodiment, devices 204, 206 communicate at different data rates than devices 208 and 210 and are incompatible with the devices 208 and 210, so that the devices 204-210 are not able to coexist within the same area 202. Devices 204, 206 may be implemented to operate in the 5 GHz band, although other frequency bands are contemplated.

Figure 3:
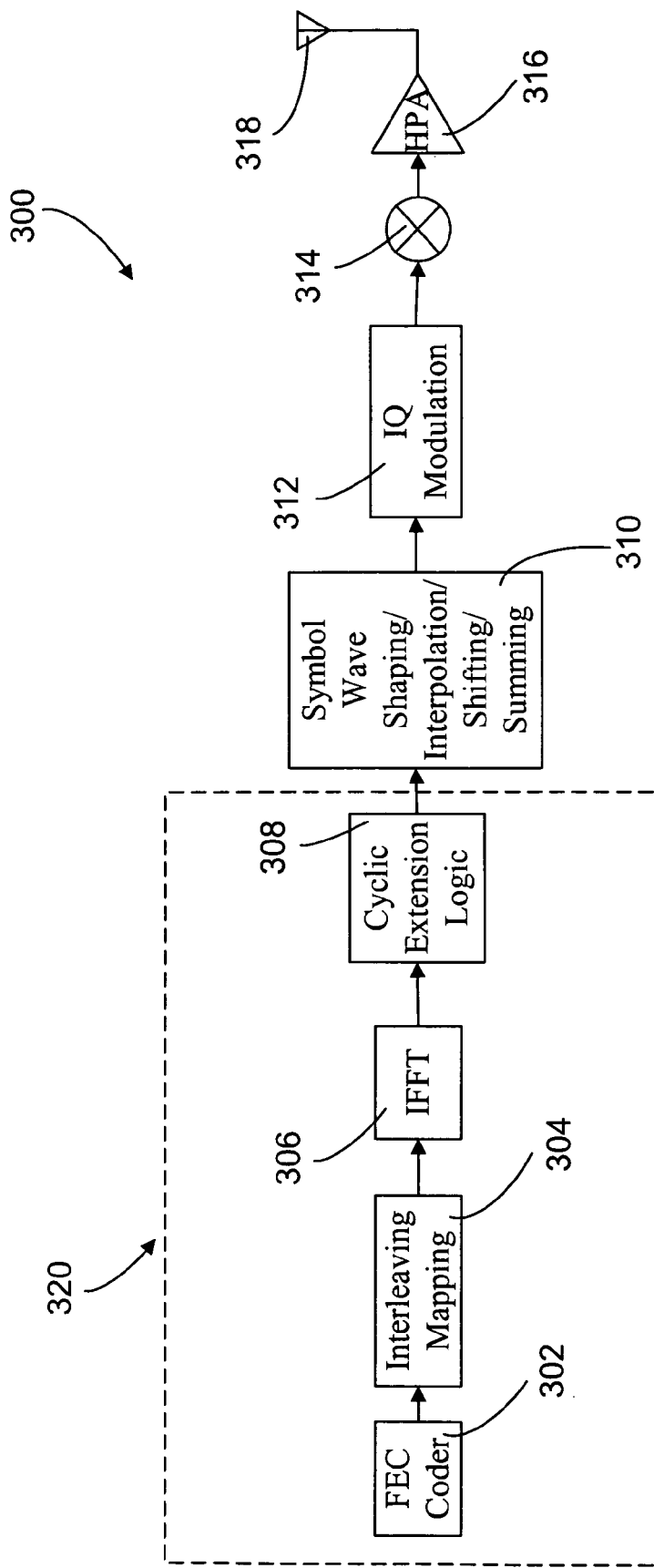
FIG. 3 is a block diagram of an exemplary embodiment of a transmitter of a communications device in the local area network of FIG. 2.

One embodiment of a transmitter for an 802.11 device is provided in FIG. 3. Referring to FIG. 3, a PHY unit 300 includes an orthogonal frequency division multiplex (OFDM) transmit kernel 320, a symbol wave shaper/interpolator/shifter/summer(accumulator, assimilator) 310, an IQ modulator 312, a mixer 314, high power amplifier (HPA) 316, and antenna 318. OFDM transmit kernel 320 includes an FEC coder 302 (for encoding the data received from a MAC unit), an interleaver/mapper 304, an inverse fast Fourier transform (IFFT) unit 306, and cyclic extension logic 308.

During a data transmit process, data and control information are received at the FEC coder 302. The FEC coder 302 encodes data in a forward error correction code. Any forward error correction (FEC) code can be used for this purpose. FEC code examples include a Reed-Solomon and a combination Reed-Solomon and convolution code, among others. The interleaver/mapper 304 subsequently interleaves (reorders, distributes) the encoded data. The output of the interleaver/mapper 304 is sent to the IFFT unit 306. The IFFT unit 306 receives input from the interleaver/mapper 304 and provides OFDM symbols to the cyclic extension logic 308. The cyclic extension logic 308 inserts a cyclic prefix (e.g., guard interval) to ensure that the transmitted symbol retains its orthogonal properties in the presence of multi-path delay spread. The output of the cyclic extension logic 308 is sent to the symbol wave shaper/interpolator/shifter/summer 310. Symbol wave shaper/interpolator/shifter/summer 310 comprises a low-pass filter to smooth the edges between successive OFDM symbols. The trailing edge and leading edge of each OFDM symbol is tapered to prevent spectral splattering outside the frequency channel, minimizing adjacent interference and satisfying regulatory concerns. The symbol wave shaper/interpolator/shifter/summer 310 also comprises interpolation, shifting, and summing functionality as described below.

The output of symbol wave shaper/interpolator/shifter/summer 310 is sent to modulator 312. The modulator 312 modulates the encoded data onto carriers in OFDM symbols in accordance with conventional OFDM modulation techniques. The modulation techniques may be coherent or differential. The modulation mode or type may be Binary Phase Shift Keying and Quadrature Phase Shift Keying, among others.

The output of the modulator 312 is sent to mixer 314 where it is upconverted to the desired transmit frequency. The upconversion may be performed in multiple mixer stages. From mixer 314, the upconverted signal is amplified in high powered amplifier (HPA) 316 and sent to antenna 318 for transmission.

Figure 4:
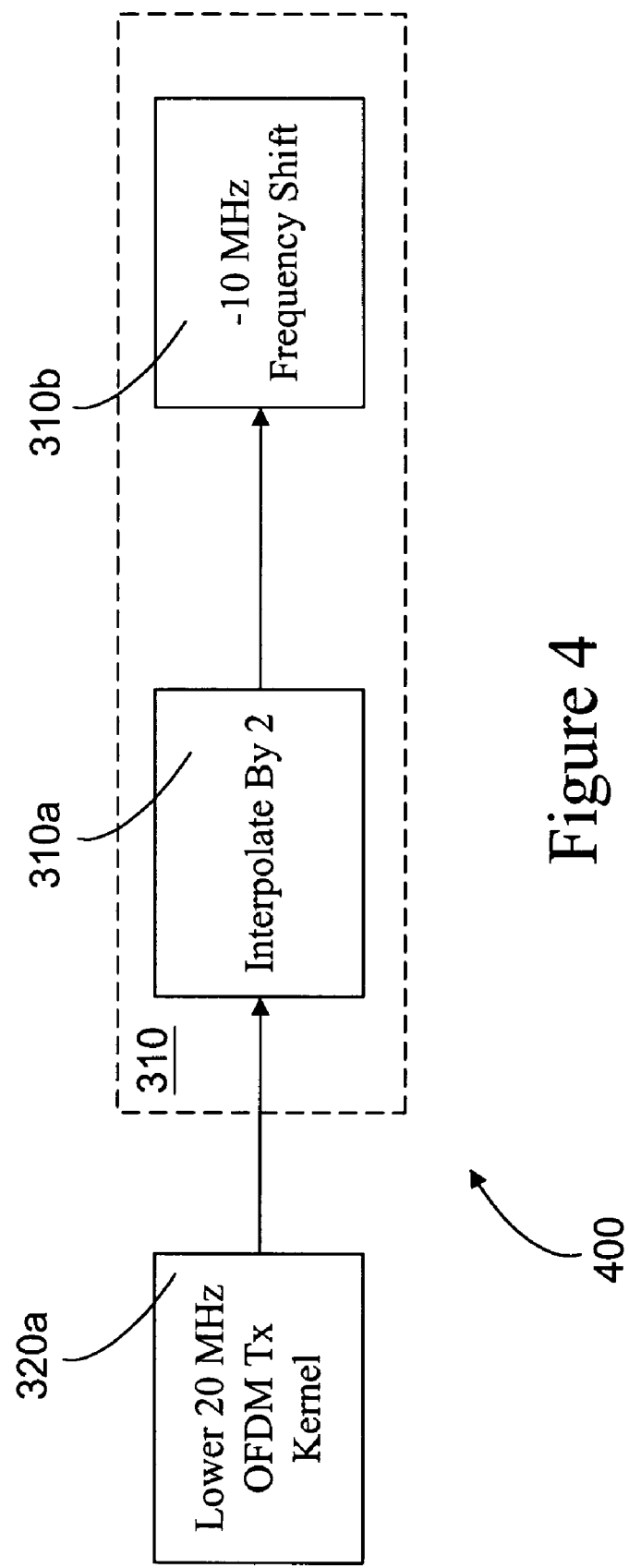
FIG. 4 is a block diagram of an exemplary embodiment of a low frequency input section to the transmitter of FIG. 3.

To increase the bandwidth of the signal, a processor (not shown) in the PHY 102 (FIG. 1) manipulates the OFDM signal. This discussion will focus on a scenario with two inputs, increasing the bandwidth by a factor of 2. However, the approach is applicable to any number of substantially simultaneous inputs. In one embodiment of an 802.11n system, two 20 MHz 802.11a input signals are received at the PHY unit 300 substantially simultaneously. The two signals are processed separately, one in a lower 20 MHz path and one in an upper 20 MHz path. A lower 20 MHz path 400 is presented in FIG. 4 and includes lower 20 MHz OFDM transmit kernel 320a, interpolator 310a, and −10 MHz frequency shifter 310b. One of the inputs is first processed by the lower 20 MHz OFDM transmit kernel 320a which corresponds to the transmit kernel 320 from FIG. 3. The lower 20 MHz OFDM transmit kernel 320a sends the signal to an interpolation stage 310a where the signal is interpolated by a factor of the number of signals received substantially simultaneously. Interpolation stage 310a corresponds to shaper/interpolator/shifter/summer 310 of FIG. 3. In this exemplary embodiment, two signals are received, so the interpolation factor is 2.

The interpolation stage 310a increases the sample rate of the signal. If the signal is interpolated by 2, the sample rate is doubled. Interpolation can be performed by inserting zeros (i.e. zero stuffing) between the original samples. Then, this zero-stuffed sample stream is low-pass filtered (e.g. in symbol shaper 310 of FIG. 3). The low-pass filter is designed so the original spectrum is maintained, and only the bandwidth is doubled. This zero-stuffed example is but one method of interpolation. Another method would be to duplicate each individual sample. Other methods known to one of ordinary skill in the art would also apply. The output of interpolation stage 310a is then shifted down by 10 MHz at frequency shift stage 310b. Frequency shift stage 310b corresponds to shaper/interpolator/shifter/summer 310 of FIG. 3. The frequency shift is performed by multiplying the sample by $e^{j2\Pi f_{shift}t}$, where $f_{shift}$ is the amount of desired frequency shift.

Figure 5:
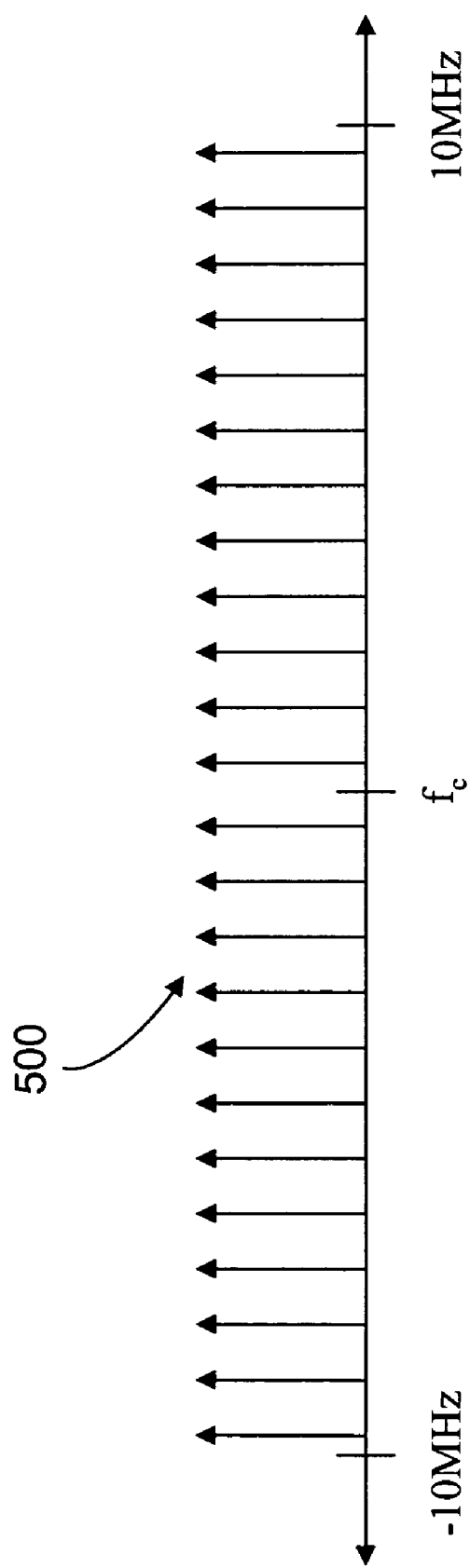
FIG. 5 is a graphical representation of the frequency spectrum of an exemplary embodiment of an input signal for the input section provided in FIG. 4.
Figure 6:
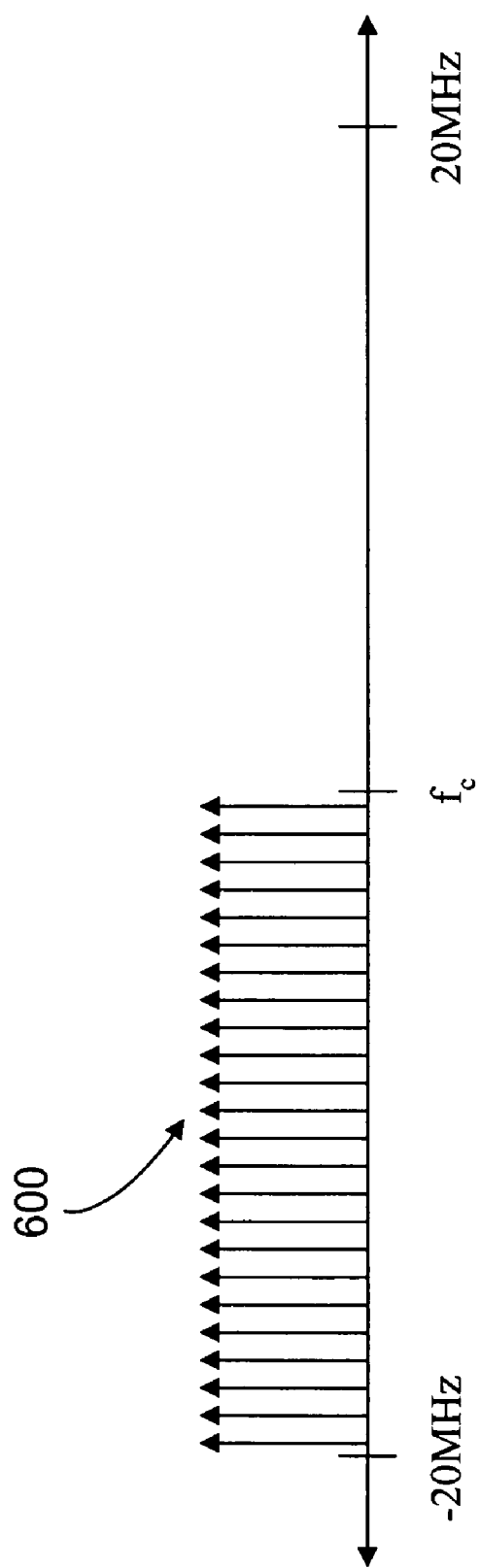
FIG. 6 is a graphical representation of the frequency spectrum of an exemplary embodiment of an input signal according to FIG. 5 that has been interpolated and shifted down.

FIG. 5 presents an exemplary 20 MHz 802.11a OFDM signal 500 centered at center frequency $f_c$. After being processed in the interpolation stage 310a (FIG. 4) and the frequency shift stage 310b, the resulting 40 MHz down-shifted signal 600 is formed, as presented in FIG. 6.

Figure 7:
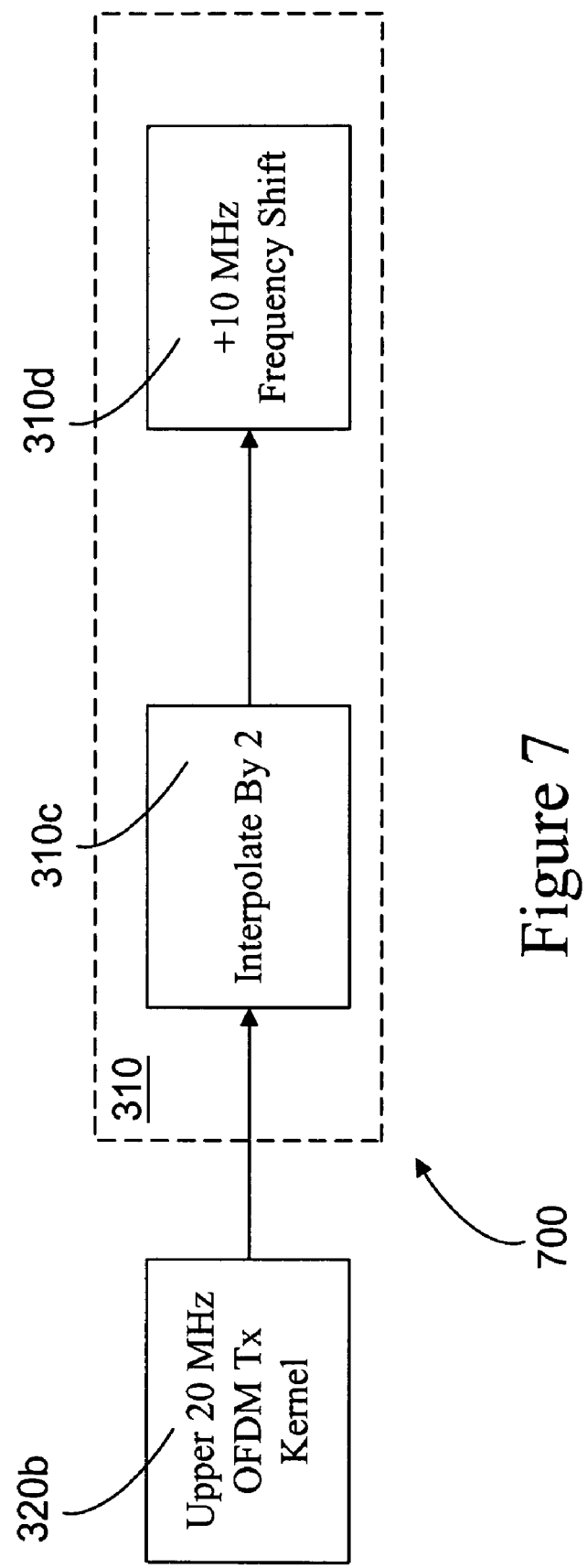
FIG. 7 is a block diagram of an exemplary embodiment of a high frequency input section to the transmitter of FIG. 3.

An upper 20 MHz path 700 is presented in FIG. 7, and comprises upper 20 MHz OFDM transmit kernel 320b, interpolator 310c, and +10 MHz frequency shifter 310d. One of the inputs is first processed by the upper 20 MHz OFDM transmit kernel 320b which corresponds to the transmit kernel 320 from FIG. 3. The upper 20 MHz OFDM transmit kernel 320b sends the signal to an interpolation stage 310c where the signal is interpolated by a factor of the number of signals received substantially simultaneously. Interpolation stage 310c corresponds to shaper/interpolator/shifter/summer 310 of FIG. 3. In this exemplary embodiment, two signals are received, so the interpolation factor is 2. The output of interpolation stage 310c is then shifted up by 10 MHz at frequency shift stage 310d. Frequency shift stage 310d corresponds to shaper/interpolator/shifter 310 of FIG. 3. The frequency shift is performed by multiplying the sample by $e^{j2\Pi f_{shift}t}$ where $f_{shift}$ is the amount of desired frequency shift.

Figure 8:
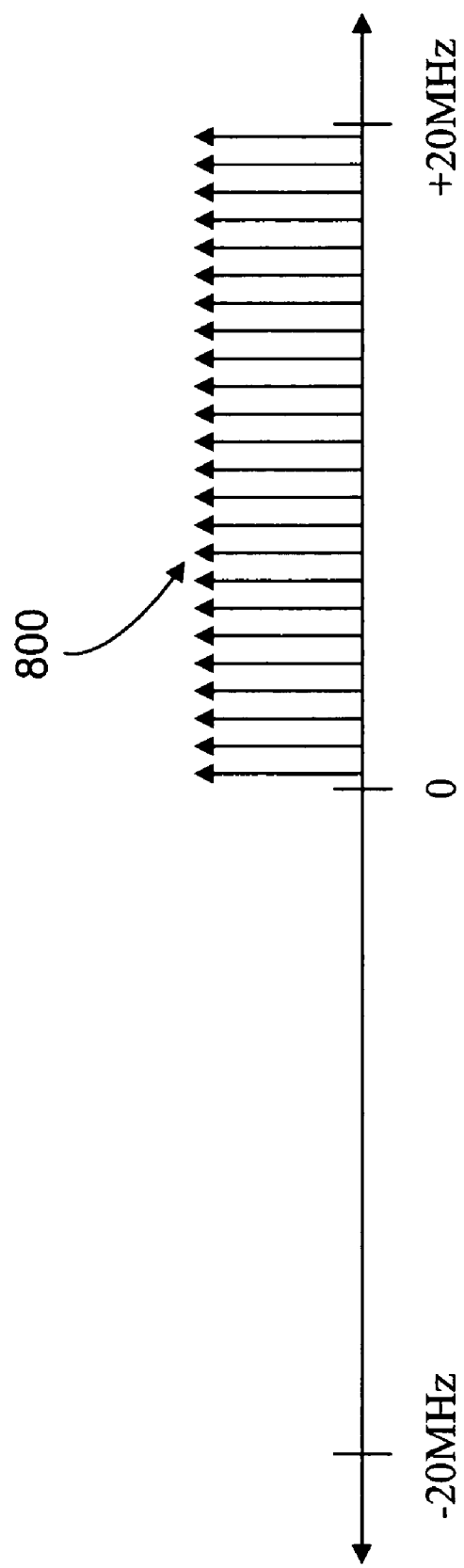
FIG. 8 is a graphical representation of the frequency spectrum of an exemplary embodiment of an input signal according to FIG. 5 that has been interpolated and shifted up.

An exemplary 20 MHz 802.11a OFDM signal 500 (as provided in FIG. 5), centered at center frequency $f_c$, is processed in the interpolation stage 310c and the frequency shift stage 310d. The resulting 40 MHz up-shifted signal 800 is formed, as presented in FIG. 8.

Figure 9:
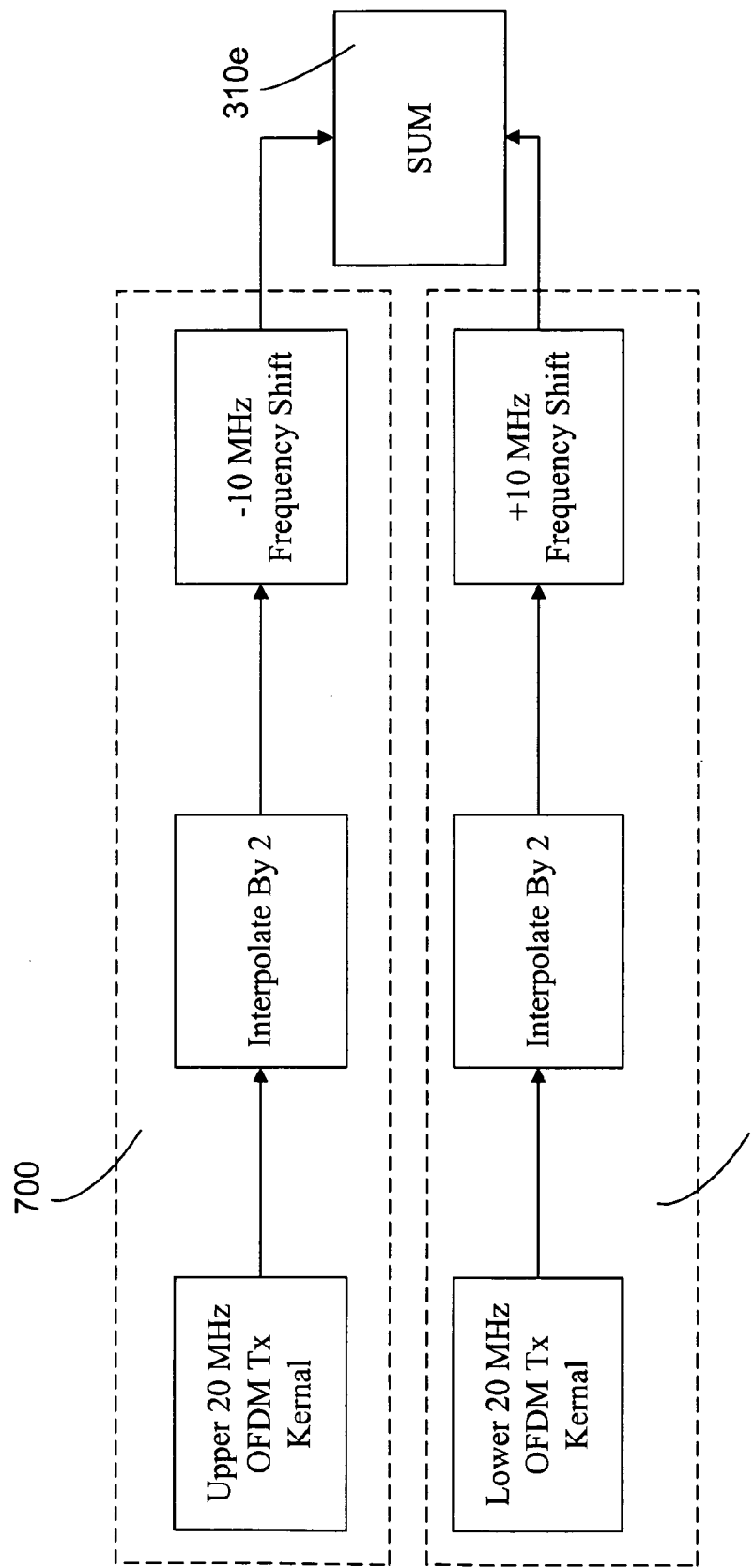
FIG. 9 is a block diagram of an exemplary embodiment of a system for adding the outputs of the input sections of FIGS. 4 and 7 into a composite signal.
Figure 10:
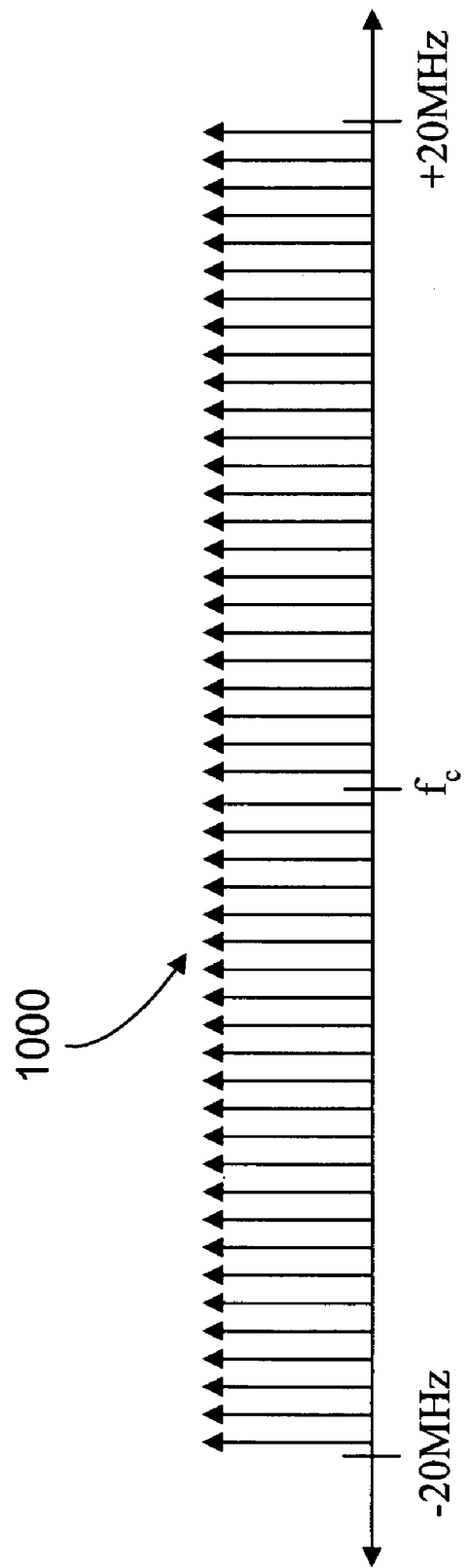
FIG. 10 is a graphical representation of the frequency spectrum of an exemplary embodiment of the composite signal of FIG. 9.

FIG. 9 presents an exemplary embodiment with 2 signal paths, upper path 700 and lower path 400, each processing a 20 MHz 802.11a input signal substantially simultaneously. The output of each path is aggregated in adder 310e to achieve, in this exemplary embodiment, a signal 1000 with a 40 MHz bandwidth and a 40 MHz sample rate as shown in FIG. 10. As provided above, this process could be easily adapted for other systems with different protocols, with different frequencies, and with more input signals.

For a system with "x" number of input signals with substantially similar bandwidths and center frequencies, received substantially simultaneously, the interpolation stage is performed by interpolating by a factor equal to "x." In the shifting stage, the method is dependent on whether "x" is odd or even.

Figure 11:
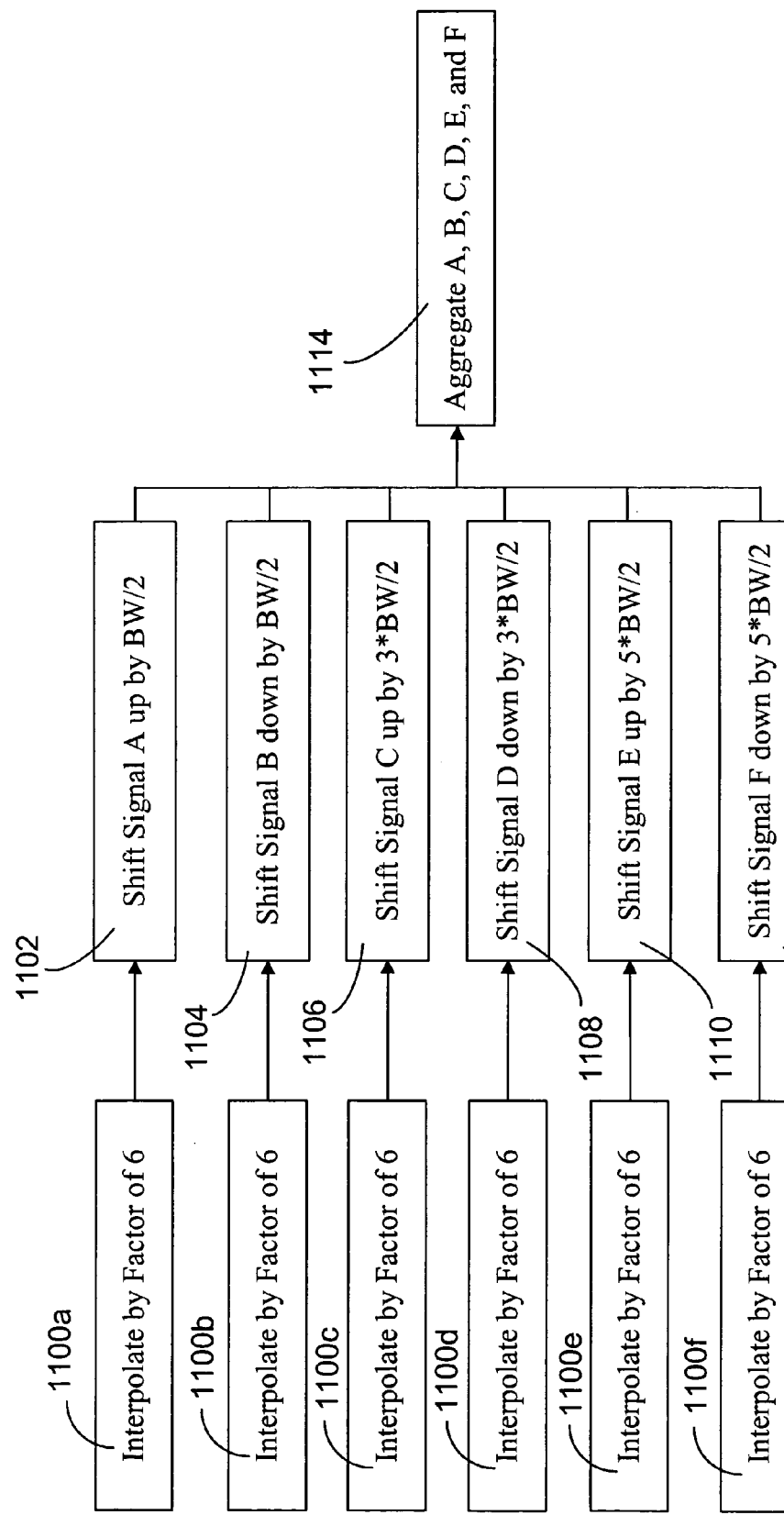
FIG. 11 is a flow diagram of the system of FIG. 9 with an even number of input signals.

If "x" is even, each signal is shifted from the center frequency by a succeeding multiple of the bandwidth (BW) of the signal. For example, as illustrated in FIG. 11, if six 10 MHz signals (A, B, C, D, E, and F) are received, each is interpolated by a factor of six (6) in blocks 1100a-1100f. Each signal with a 10 MHz sample rate is interpolated such that each has a revised sample rate of 60 MHz. Then, in block 1102, signal A is shifted up by the BW/2. In block 1104, signal B is shifted down by BW/2. In block 1106, signal C is shifted up by 3*BW/2. In block 1108, signal D is shifted down by 3*BW/2. In block 1110, signal E is shifted up by 5*BW/2. In block 1112, signal F is shifted down by 5*BW/2. In block 1114, the six shifted signals are aggregated into one composite signal for transmission. This process is applicable for any even number of input signals. Each simultaneous input is interpolated and shifted from the center frequency by a progressive odd multiple of BW/2 on alternating sides of the center frequency.

Figure 12:
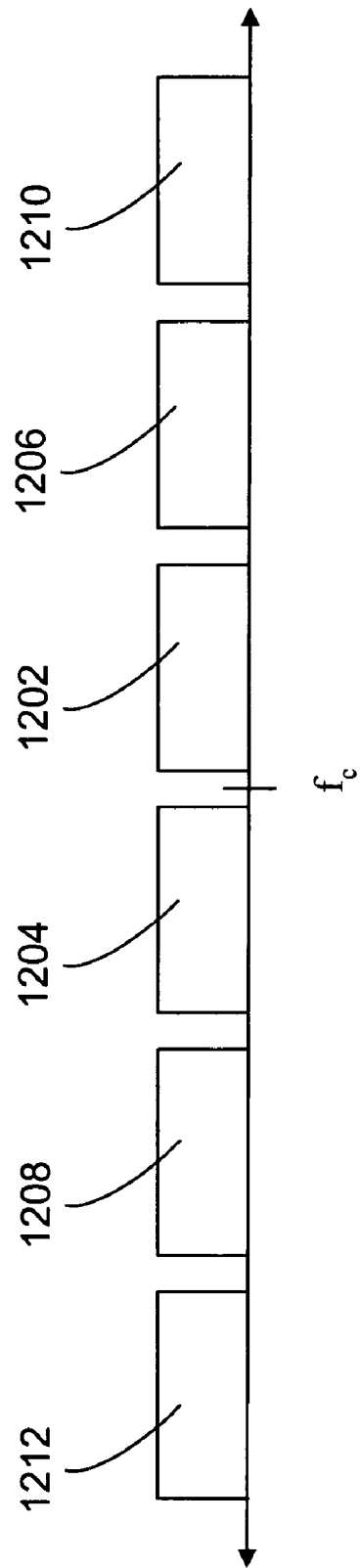
FIG. 12 is a graphical representation of the frequency spectrum of an output corresponding to the flow diagram of FIG. 11.

FIG. 12 demonstrates how an even number of signals are distributed from the center frequency. Signal A 1202 is shifted up by BW/2, signal B 1204 is shifted down by BW/2, signal C 1206 is shifted up by 3*BW/2, signal D 1208 is shifted down by 3*BW/2, signal E 1210 is shifted up by 5*BW/2, and signal F 1212 is shifted down by 5*BW/2.

The shifting of the signals is covered by the following expression:

$$-R*(N-1)/2+(K-1)*R,$$

where R is the signal sample rate and N is the total number of digital inputs.

Figure 13:
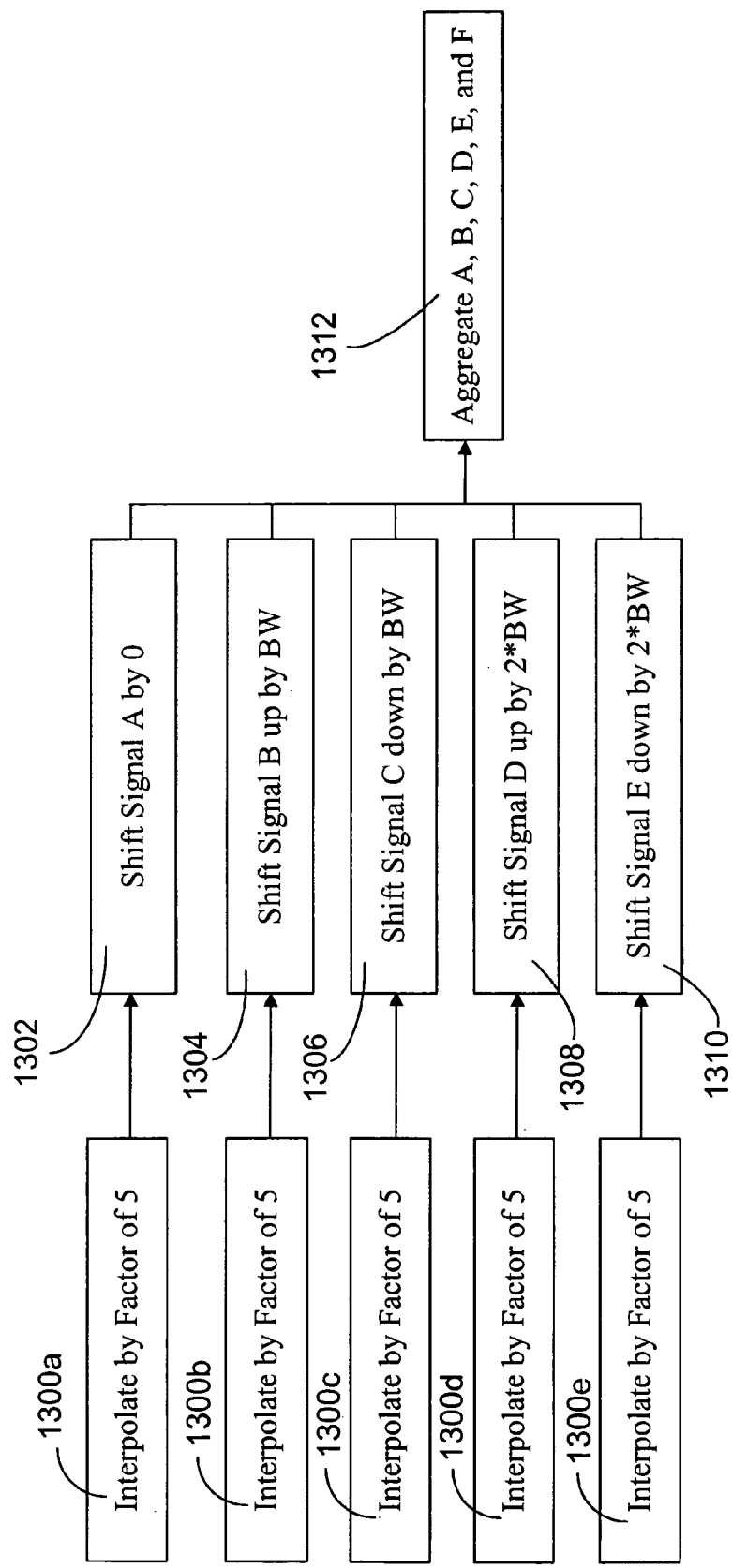
FIG. 13 is a flow diagram of the system of FIG. 9 with an odd number of input signals.

The process is slightly different for an odd number of inputs. If "x" is odd, one signal is not shifted, or, equivalently, it is shifted by a factor of zero*BW (i.e., zero multiplied by the BW). Each of the other signals received substantially simultaneously is shifted from the center frequency by a succeeding multiple of the BW of the signal. For example, as demonstrated in FIG. 13, if five 10 MHz signals (A, B, C, D, and E) are received, in blocks 1300a-1300e, each is first interpolated by a factor of 5 corresponding to the number of received signals. If each signal had a 10 MHz sample rate, each is interpolated such that each has a revised sample rate of 50 MHz. Then, in block 1302, signal A is not shifted. Each of the remaining signals (B, C, D, and E) are shifted by a multiple of the BW of the signal. In block 1304, signal B is shifted up by BW. In block 1306, signal C is shifted down by BW (i.e., 1*BW). In block 1308, signal D is shifted up by 2*BW. In block 1310, signal E is shifted down by 2*BW. In block 1312, the five shifted signals are aggregated into one composite signal for transmission. This process is applicable for any odd number of input signals. Each substantially simultaneous input is interpolated and shifted from the center frequency by a progressive multiple of the BW on alternating sides of the center frequency.

Figure 14:
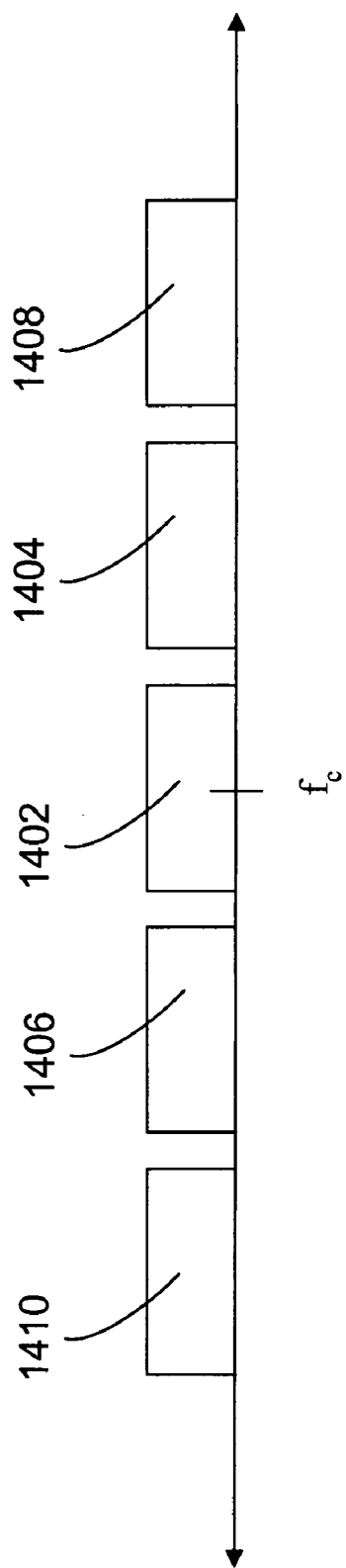
FIG. 14 is a graphical representation of the frequency spectrum of an output corresponding to the flow diagram of FIG. 13.

FIG. 14 demonstrates how an odd number of signals are distributed from the center frequency. Signal A 1402 is not shifted. Each of the remaining signals (B, C, D, and E) are shifted by a multiple of the BW of the signal. That is, signal B 1404 is shifted up by BW, signal C 1406 is shifted down by BW, signal D 1408 is shifted up by 2*BW, and signal E 1410 is shifted down by 2*BW.

For both odd and even numbers of signals, the process of shifting of the signals is described by the following expression:

$$-R*(N-1)/2+(K-1)*R,$$

where R is the signal sample rate and N is the total number of digital inputs.

Figure 15:
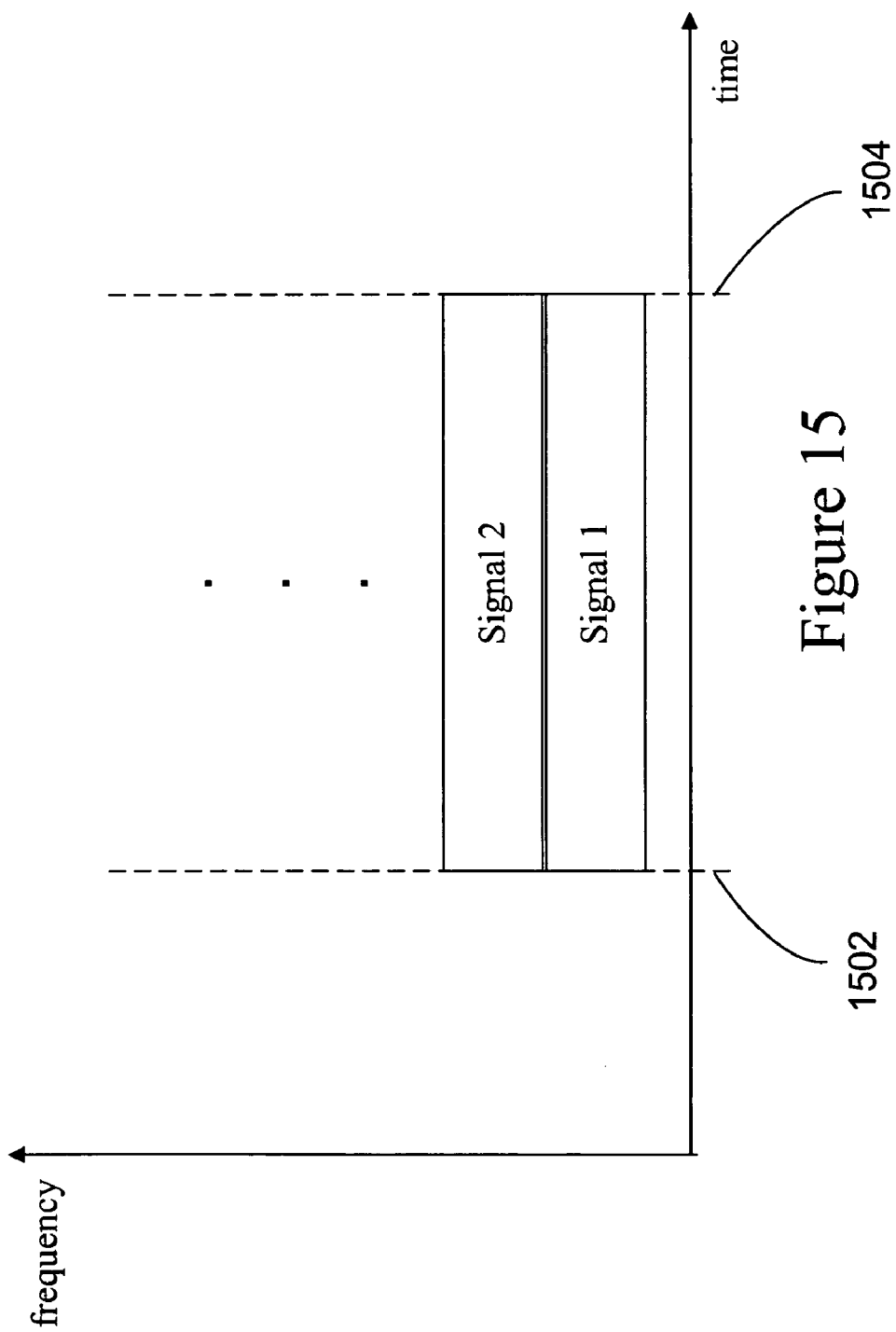
FIG. 15 is a graphical representation of the frequency versus time relationship of multiple packets in the composite signal in the exemplary embodiment of FIG. 9.

FIG. 15 is a graph of each signal and its frequency vs. time relationship. Each signal's start time 1502 and end time 1504 should be substantially equivalent to eliminate problems with multiple signal acquisition and termination. These problems may include transmitting and receiving simultaneously. By occupying "both" channels at the same time, simultaneous transmitting and receiving is enabled.

A receiver for such a system samples at the aggregate bandwidth. For the IEEE 802.11n exemplary embodiment, the individual halves are frequency shifted and then low-pass filtered. The output of the low-pass filters have the sample rate decimated by 2, filtering out every other sample, or, in other words, filtering out the zeros of the zero-stuffed signal.

While various embodiments of the invention have been described, it will be apparent to those of ordinary skill in the art that many more embodiments and implementations are possible that are within the scope of this invention.

What is claimed is:

1. A method comprising:
    obtaining, by a device, a plurality of signals, each of the plurality of signals comprising a plurality of modulated subcarriers and having an initial sample rate;
    increasing a sample rate of each of the plurality of signals by a factor equal to a number of signals in the plurality of signals to produce a plurality of increased sample rate signals;
    shifting two or more of the plurality of increased sample rate signals in frequency by a multiple of the initial sample rate to produce two or more frequency-shifted increased sample rate signals, wherein the shifting is dependent upon whether the plurality of signals constitute an even number of signals or an odd number of signals;
    combining the two or more frequency-shifted increased sample rate signals and any of the plurality of increased sample rate signals not subject to shifting to produce a combination signal; and
    transmitting the combination signal from an antenna.

2. The method of claim 1, wherein the plurality of signals are obtained substantially simultaneously.

3. The method of claim 1, wherein the initial sample rate of each of the plurality of signals is 20MHz.

4. The method of claim 3, wherein increasing the sample rate of each of the plurality of signals comprises interpolating each of the plurality of signals by a factor corresponding to the number of signals in the plurality of signals.

5. The method of claim 1, wherein the increasing, the shifting and the combining is performed by at least one of a digital signal processor (DSP), a microprocessor, a general purpose processor, or an application specific integrated circuit.

6. The method of claim 1, wherein increasing the sample rate comprises interpolating each of the plurality of signals.

7. The method of claim 6, wherein each of the plurality of signals is interpolated by a factor of two.

8. The method of claim 1, wherein the modulated subcarriers of the plurality of signals correspond to orthogonal frequency division multiplexed signals.

9. The method of claim 1, wherein shifting two or more of the plurality of increased sample rate signal in frequency by a multiple of the initial sample rate comprises shifting each signal by $-R*(N-1)/2+(K-1)*R$, where R is the initial sample rate, K is an index number of the signal, and N is the total number of signals in the plurality of signals.

10. The method of claim 1, wherein the method is a method of wireless communication.

11. The method of claim 1, wherein, if the plurality of signals constitute an even number of signals, all of the plurality of increased sample rate signals are shifted with respect to a center frequency.

12. The method of claim 1, wherein, if the plurality of signals constitute an odd number of signals, all but one of the plurality of increased sample rate signals are not shifted with respect to a center frequency.

13. A system comprising:
    an interpolator configured to receive a plurality of signals, each of the plurality of signals comprising a plurality of modulated subcarriers and having an initial sample rate, wherein the interpolator is further configured to produce a plurality of interpolated signals by increasing a sample rate of each of the plurality of signals by a factor equal to a number of signals in the plurality of signals;
    a frequency shifter configured to shift a frequency of two or more of the plurality of interpolated signals by a multiple of the initial sample rate to produce two or more frequency-shifted interpolated signals, wherein the frequency shifter is configured to shift based upon whether the plurality of signals constitute an even number of signals or an odd number of signals; and
    an assimilator configured to assimilate two or more of the plurality of frequency-shifted interpolated signals and any of the plurality of interpolated signals not subject to shifting by the frequency shifter to produce an assimilated signal.

14. The system of claim 13, wherein the interpolator is configured to increase the sample rate by a factor of two.

15. The system of claim 13, wherein the received plurality of signals correspond to orthogonal frequency division multiplexed signals.

16. The system of claim 13, wherein the frequency shifter is configured to shift two or more of the plurality of interpolated signals by $-R*(N-1)/2+(k-1)*R$, where R is the initial sample rate, N is the total number of signals in the plurality of signals, and K is the signal's index number.

17. The system of claim 13, wherein the frequency shifter is configured to shift all of the plurality of interpolated signals with respect to a center frequency if the plurality of signals constitute an even number of signals.

18. The system of claim 13, wherein the frequency shifter is configured to shift all but one of the plurality of interpolated signals with respect to a center frequency if the plurality of signals constitute an odd number of signals.

19. A device comprising:
   a processor; and
   a memory having instructions stored thereon that, in response to being executed by a processor, the instructions cause the device to
      obtain a plurality of signals, each of the plurality of signals comprising a plurality of modulated subcarriers and having an initial sample rate;
      interpolate each of the plurality of signals by a factor equal to a number of signals in the plurality of signals to produce a plurality of interpolated signals;
      shift two or more of the plurality of interpolated signals in frequency by a multiple of the initial sample rate to produce two or more frequency-shifted interpolated signals, wherein the means for shifting is configured to shift based upon whether the plurality of signals constitute an even number of signals or an odd number of signals; and
      sum the two or more of frequency-shifted interpolated signals and any of the plurality of interpolated signals not subject to shifting to produce a summation signal.

20. The device of claim 19, wherein the instructions cause the device to shift each signal by $-R*(N-1)/2+(K-1)*R$, where R is the initial sample rate, N is the total number of signals in the plurality of signals, and K is the signal's index number.

21. The device of claim 19, wherein the instructions cause the device to shift all of the plurality of interpolated signals with respect to a center frequency if the plurality of signals constitute an even number of signals.

22. The device of claim 19, wherein the instructions cause the device to shift all but one of the plurality of interpolated signals with respect to a center frequency if the plurality of signals constitute an odd number of signals.

23. A transmitter comprising:
   a first input communicatively coupled to a processor, the first input configured to receive a first signal comprising a plurality of orthogonal frequency division multiplexed subcarriers, the first signal having a sample rate of approximately 20 MHz and a center frequency $f_c$;
   the processor configured to interpolate the first signal to increase the sample rate of the first signal such that it has a sample rate of approximately 40 MHz, the processor further configured to shift the center frequency of the first signal to ($f_c$ +10 MHz) by multiplying the first signal by $e^{j2\Pi 10t}$ for time t;
   a second input communicatively coupled to the processor, the second input configured to receive a second signal comprising a plurality of orthogonal frequency division multiplexed subcarriers, the second signal having a sample rate of approximately 20 MHz and a center frequency $f_c$;
   the processor further configured to interpolate the second signal to increase the sample rate of the second signal such that it has a sample rate of approximately 40 MHz, the processor further configured to shift the center frequency of the second signal to ($f_c$ _10 MHz) by multiplying the second signal by $e^{j2\Pi 10t}$;
   the processor further configured to add the shifted first signal to the shifted second signal to produce a third signal with a sample rate of 40 MHz and a center frequency of $f_c$; and
   an output communicatively coupled to the processor, the output configured to transmit the third signal.

* * * * *

UNITED STATES PATENT AND TRADEMARK OFFICE
CERTIFICATE OF CORRECTION

| | | |
|---|---|---|
| PATENT NO. | : 8,018,832 B2 | Page 1 of 1 |
| APPLICATION NO. | : 11/106915 | |
| DATED | : September 13, 2011 | |
| INVENTOR(S) | : Webster et al. | |

It is certified that error appears in the above-identified patent and that said Letters Patent is hereby corrected as shown below:

Title page, item (56), under "Other Publications", in Column 2, Line 1, delete "Wireles" and insert -- Wireless --.

Column 1, line 7, delete "to copending" and insert -- to --.

Column 9, line 3, in Claim 16, delete "-R*(N-1)/2+(k-1)*R," and insert -- -R*(N-1)/2+(K-1)*R, --.

Column 10, line 31, in Claim 23, delete "($f_c$ ₋ 10 MHz)" and insert -- ($f_c$-10 MHz) --.

Signed and Sealed this

Thirty-first Day of July, 2012

David J. Kappos
*Director of the United States Patent and Trademark Office*